United States Patent [19]

McDonough

[11] 4,365,981
[45] Dec. 28, 1982

[54] GAS FILTER

[75] Inventor: John B. McDonough, Allison Park, Pa.

[73] Assignee: Mine Safety Appliances Company, Pittsburgh, Pa.

[21] Appl. No.: 279,589

[22] Filed: Jul. 1, 1981

[51] Int. Cl.³ .................... B01D 53/14; B01D 46/30
[52] U.S. Cl. ........................................ 55/497; 55/387; 55/483; 55/484; 55/517; 55/518; 210/383
[58] Field of Search ................ 55/387, 483, 484, 497, 55/515, 517, 518, 519; 210/383

[56] References Cited

U.S. PATENT DOCUMENTS

| | | | |
|---|---|---|---|
| 2,589,229 | 3/1952 | Dauphinee | 55/307 |
| 3,350,860 | 11/1967 | Grassel et al. | 55/387 |
| 3,411,273 | 11/1968 | Duncan et al. | 55/387 |
| 3,430,420 | 3/1969 | Gross | 55/387 |

OTHER PUBLICATIONS

Sure-Sorber Activated Charcoal Filter, MSA Filter Systems, Data Sheet 15-00-11.

Primary Examiner—David L. Lacey
Attorney, Agent, or Firm—Carothers and Carothers

[57] ABSTRACT

A gas filter is formed from two uniformly spaced nesting screens extending along a serpentine path, with the space between them filled with granular filtering material. Each screen has laterally spaced areas curved in one direction lengthwise of the serpentine path and alternating with laterally spaced areas curved in the opposite direction and integrally joined thereto to thereby provide the screen with a continuous curvature from end to end of the serpentine path.

3 Claims, 3 Drawing Figures

U.S. Patent  Dec. 28, 1982  4,365,981

GAS FILTER

Known pleated or zig-zag filters are formed from nested spaced screens that have large flat areas connected by reversed bends. The space between the screens in such a filter is filled with activated charcoal for absorbing undesired gases and vapors from an air stream. The filter requires a number of supports to maintain its pleated shape. These supports add to the weight of the filter and also obstruct some of its surface area.

It is among the objects of this invention to provide a similar type of filter in which there are no supports that obstruct the filtering area, in which the only supports are at the edges of the screens, in which weight is reduced compared with conventional pleated filters, and in which pressure within the filter bed is opposed by hoop stress rather than by bending moments, whereby the strength of the bed is increased.

Figure 1:
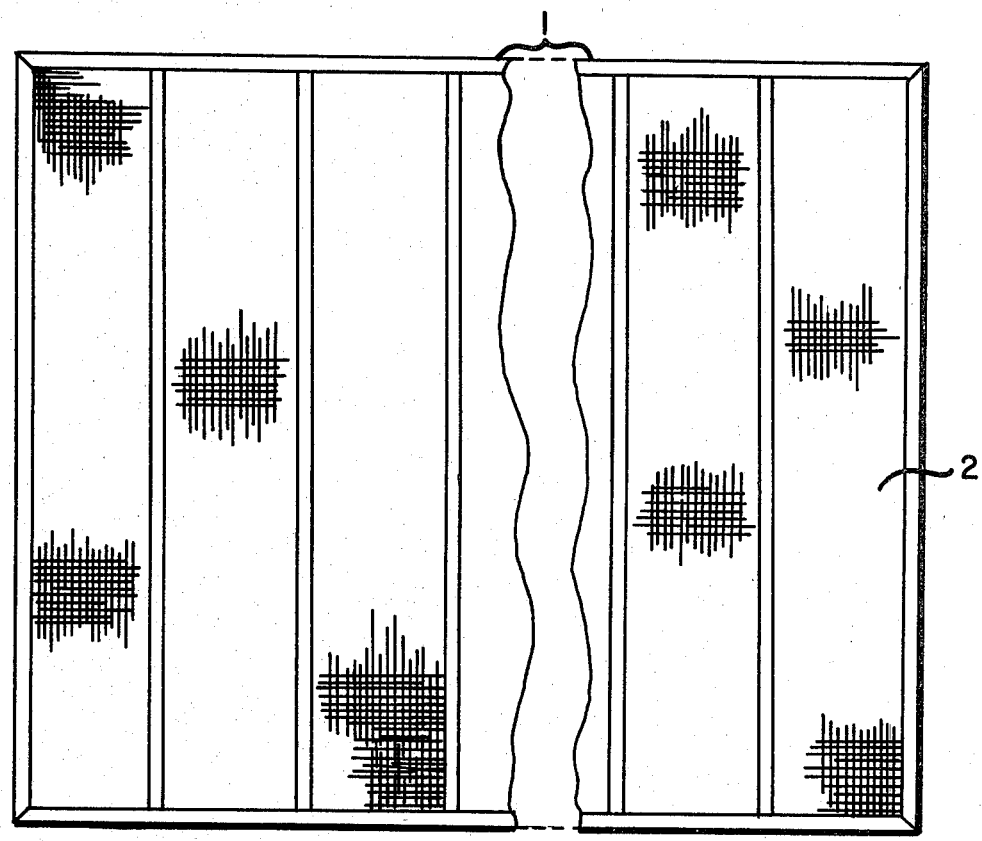
Figure 2:
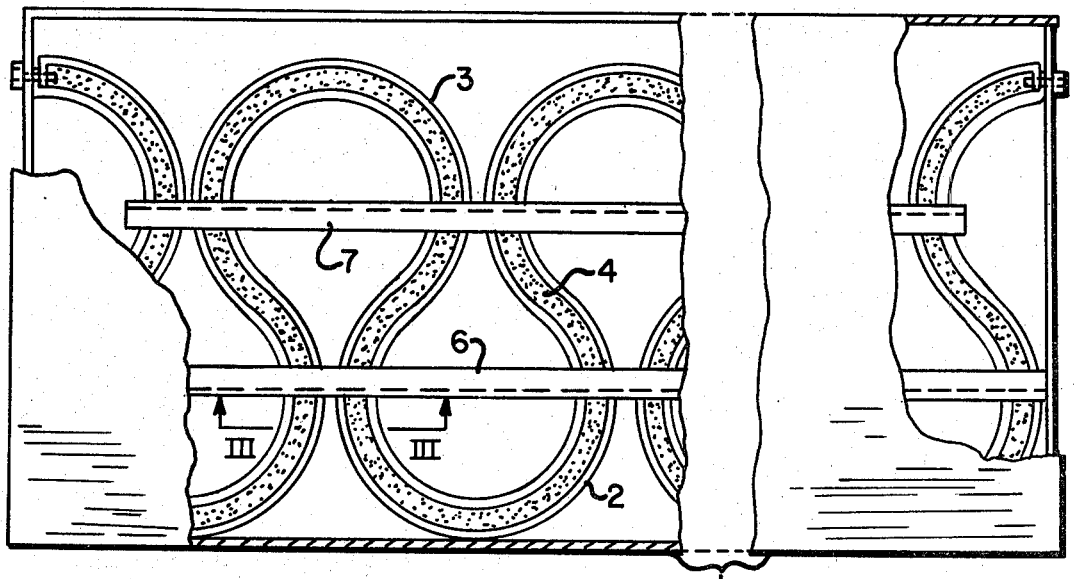
Figure 3:
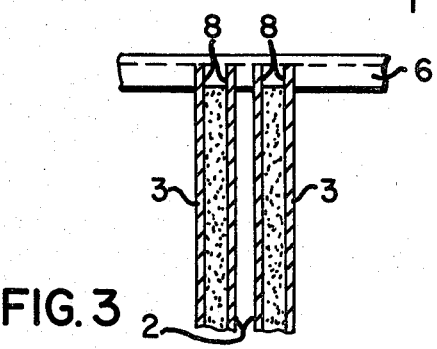

The preferred embodiment of the invention is illustrated in the accompanying drawings, in which FIG. 1 is a front view of the filter;

FIG. 2 is an enlarged plan view with portions of the top of the filter frame broken away; and FIG. 3 is a fragmentary vertical section taken on the line III—III of FIG. 2.

Referring to FIGS. 1 and 2 of the drawings, the filtering element is mounted in a rectangular frame 1 and consists of spaced screens 2 and 3 and activated charcoal 4 or other sorptive filter material filling the space between the screens to form the filter bed. The screens may be either wire or perforated thin metal sheets.

In accordance with this invention, the two screens are uniformly spaced throughout their length and are curved back and forth along a serpentine path, in which they are nested together as shown in FIG. 2. It will be seen that each screen has laterally spaced areas curved in one direction lengthwise of the serpentine path and alternating with laterally spaced areas curved in the opposite direction and integrally joined thereto, whereby to provide the screen with a continuous curvature from end to end of the serpentine path. In other words, curved surfaces of the screens are in contact with the filter bed 4 at all points. There are no flat surfaces as in the conventional zig-zag or pleated filter. The ends of the screens are attached to the sides of the surrounding frame.

The loops of the screens are held equally spaced by means of angle bars 6 and 7 extending lengthwise of the serpentine path of the filtering element at the upper and lower edges of the screens. As shown in FIG. 3, one flange of each bar is provided with vertical slots 8 that receive the edges of the screens, while the other flange of the bar lies flat against the screen edges. Due to the serpentine shape of the screens and filter bed with all surfaces curved, it is unnecessary to have any supports between the top and bottom of the filter for the loops in the screens. The absence of such supports results in reduction of the weight of the filter and permits uniform flow through the filter bed throughout its area.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A gas filter comprising two uniformly spaced nesting screens extending within a frame structure along a serpentine path, each of the screens having laterally spaced areas curved in one direction lengthwise of said path and alternating with laterally spaced areas curved in the opposite direction and integrally joined thereto to thereby provide each of the screens with a continuous curvature without any flat surfaces from end to end of said serpentine path and the lateral ends of the screens being secured to the frame structure, and granular filtering material filling the space between the screens to form a serpentine filter bed of continuous curvature.

2. A gas filter according to claim 1, further including bars extending lengthwise across said serpentine filter bed and provided with slots receiving edges of the screens to maintain the screens in their serpentine form.

3. A gas filter according to claim 2, in which each of said bars is an angle bar with said slots in one of its flanges.

* * * * *